(12) United States Patent
Stallings et al.

(10) Patent No.: US 8,289,286 B2
(45) Date of Patent: Oct. 16, 2012

(54) ZOOMING KEYBOARD/KEYPAD

(75) Inventors: Heath Stallings, Colleyville, TX (US); Sok Y. Hwang, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 518 days.

(21) Appl. No.: 12/340,180

(22) Filed: Dec. 19, 2008

(65) Prior Publication Data

US 2010/0156807 A1 Jun. 24, 2010

(51) Int. Cl.
*G06F 3/041* (2006.01)

(52) U.S. Cl. ......................................... 345/173

(58) Field of Classification Search .................. None
See application file for complete search history.

(56) References Cited

U.S. PATENT DOCUMENTS

| | | | | |
|---|---|---|---|---|
| 6,169,538 B1* | 1/2001 | Nowlan et al. | ................ | 345/168 |
| 7,694,231 B2* | 4/2010 | Kocienda et al. | ............ | 715/773 |
| 2004/0160419 A1* | 8/2004 | Padgitt | ........................... | 345/173 |
| 2004/0179044 A1* | 9/2004 | Carter et al. | .................. | 345/865 |
| 2009/0327977 A1* | 12/2009 | Bachfischer et al. | ......... | 715/863 |
| 2010/0026723 A1* | 2/2010 | Nishihara et al. | ............. | 345/671 |
| 2010/0066764 A1* | 3/2010 | Refai | ............................. | 345/660 |

FOREIGN PATENT DOCUMENTS

| JP | 05197471 A | * | 8/1993 |
|---|---|---|---|
| JP | 2005352924 A | * | 12/2005 |

\* cited by examiner

*Primary Examiner* — Jason Olson

(57) ABSTRACT

A device detects an input object that is one of in contact with or adjacent to a touch screen of the computing device, calculates a location on the touch screen that is associated with the detected input object, and enlarges a display element, associated with the location, to a first size larger than sizes associated with one or more other display elements displayed on the touch screen. The device also enlarges one or more other display elements, provided adjacent to the display element, to a second size smaller than the first size, and displays, on the touch screen, the display element enlarged to the first size and the one or more other display elements, provided adjacent to the display element, enlarged to the second size.

25 Claims, 17 Drawing Sheets

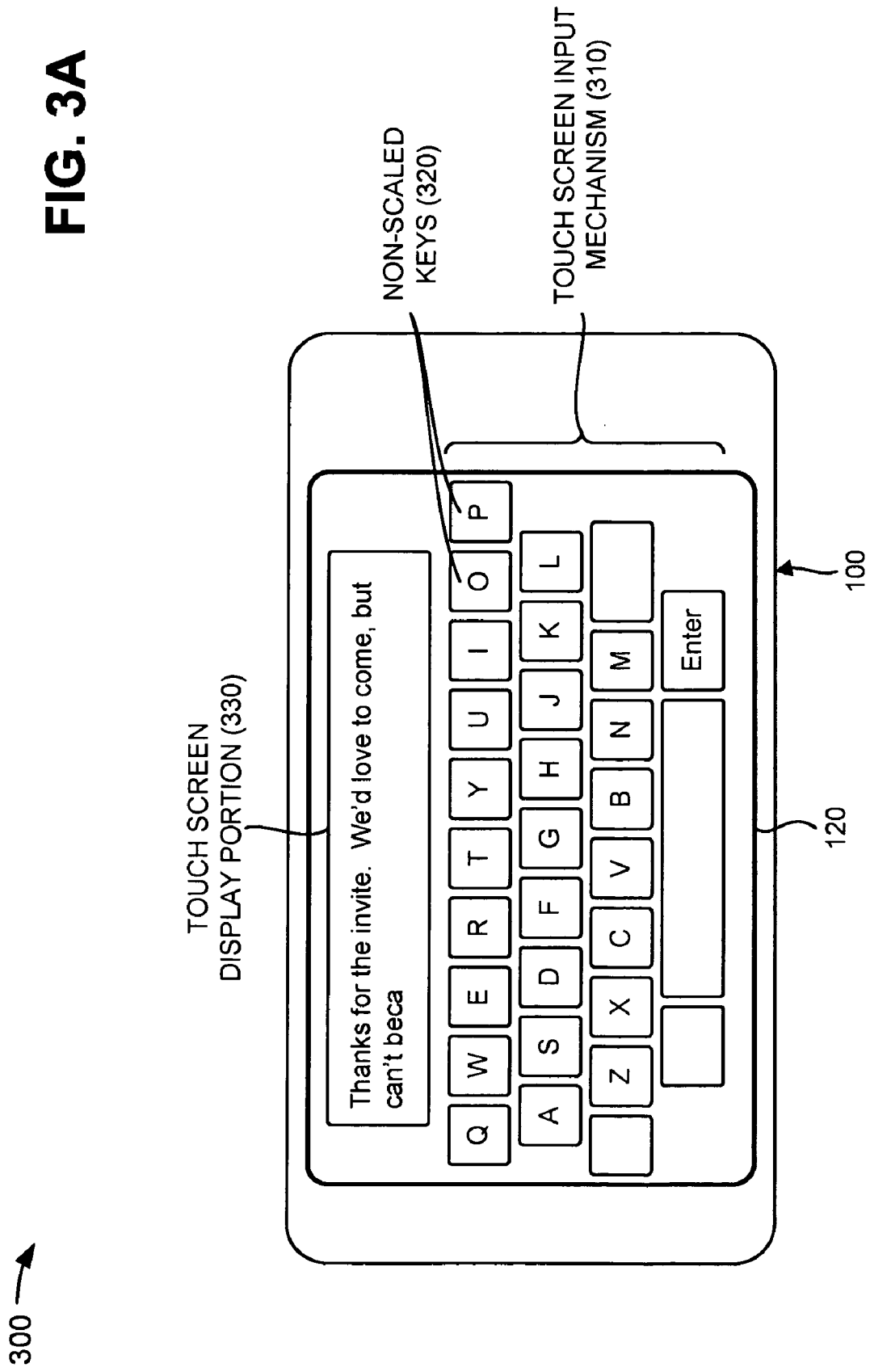

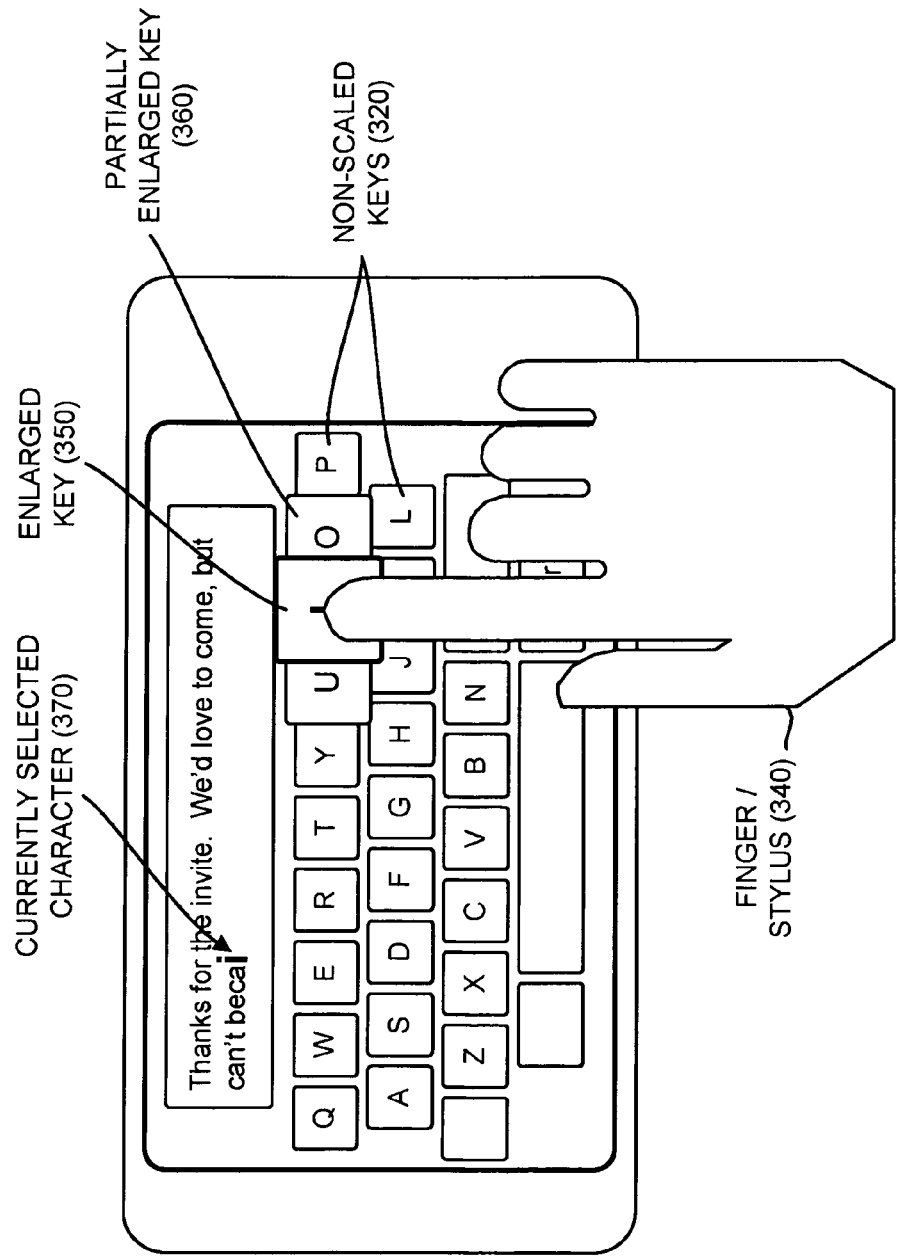

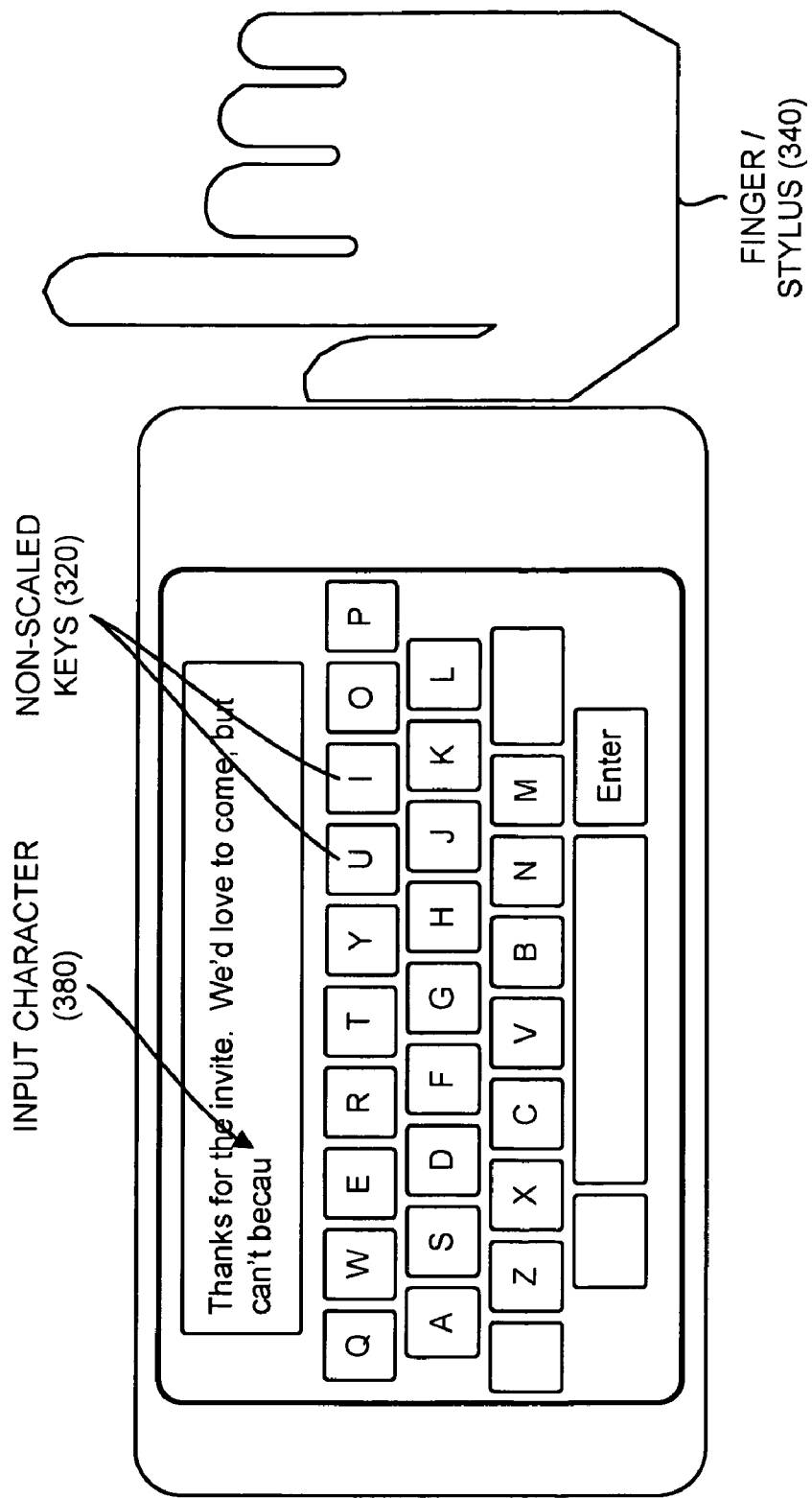

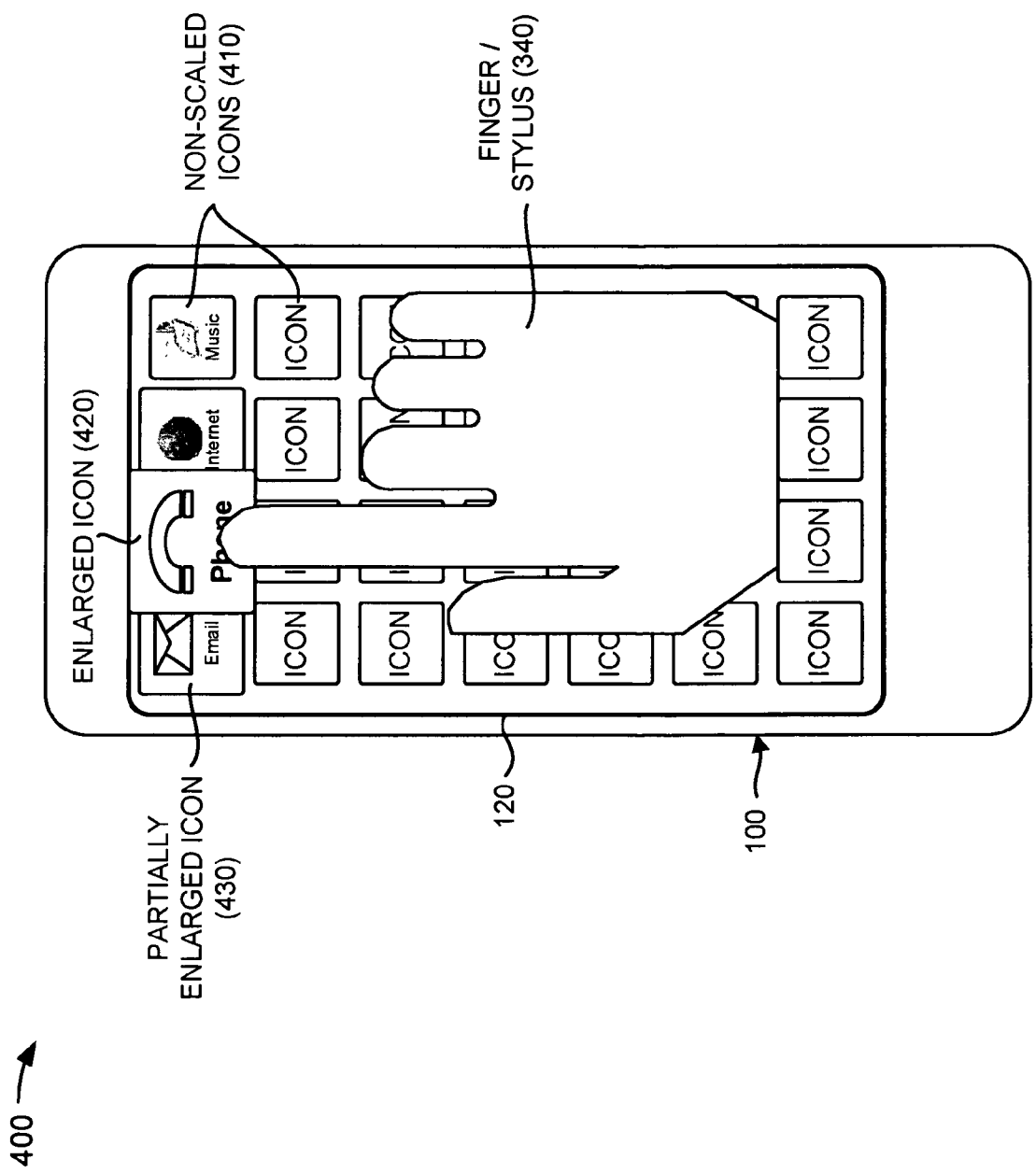

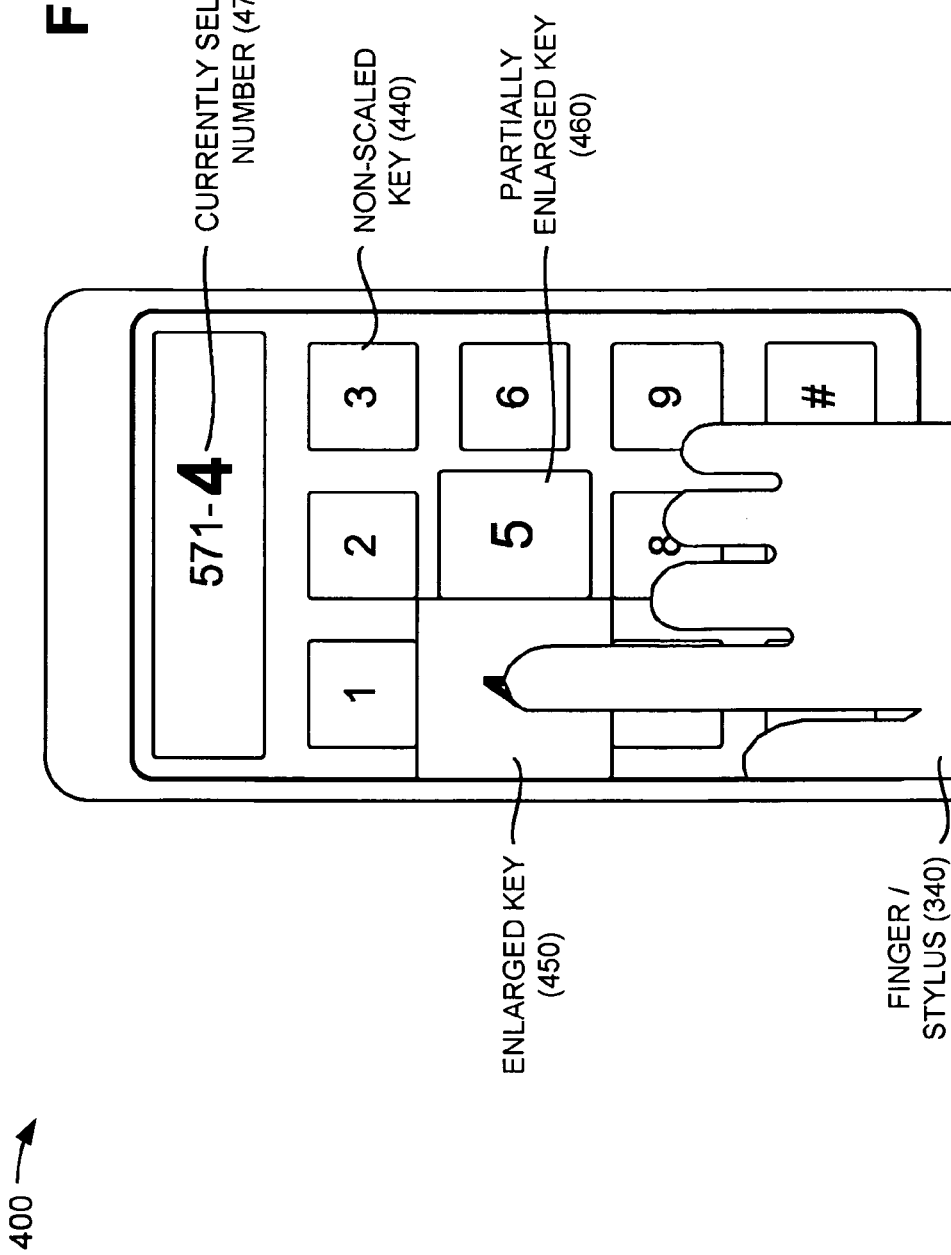

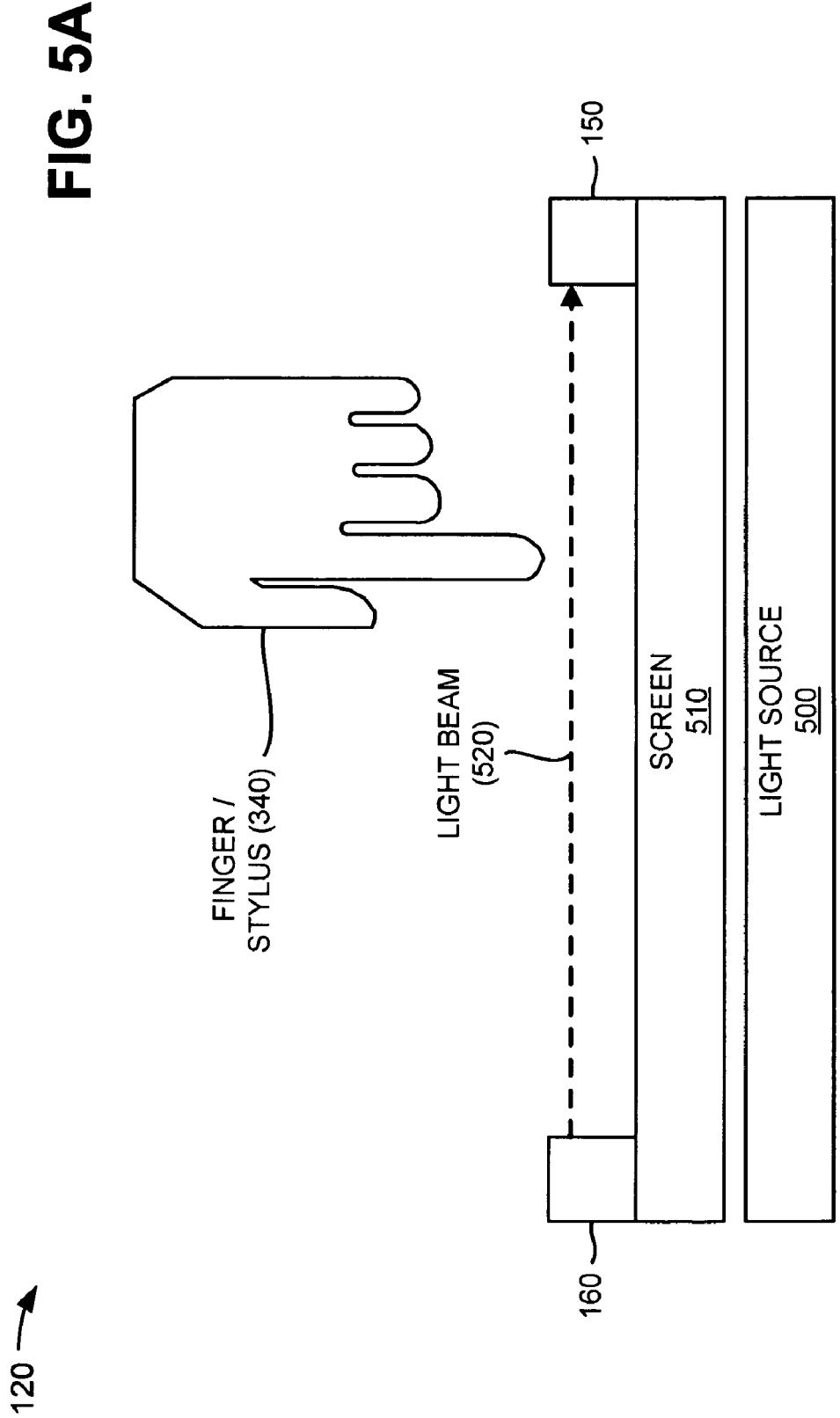

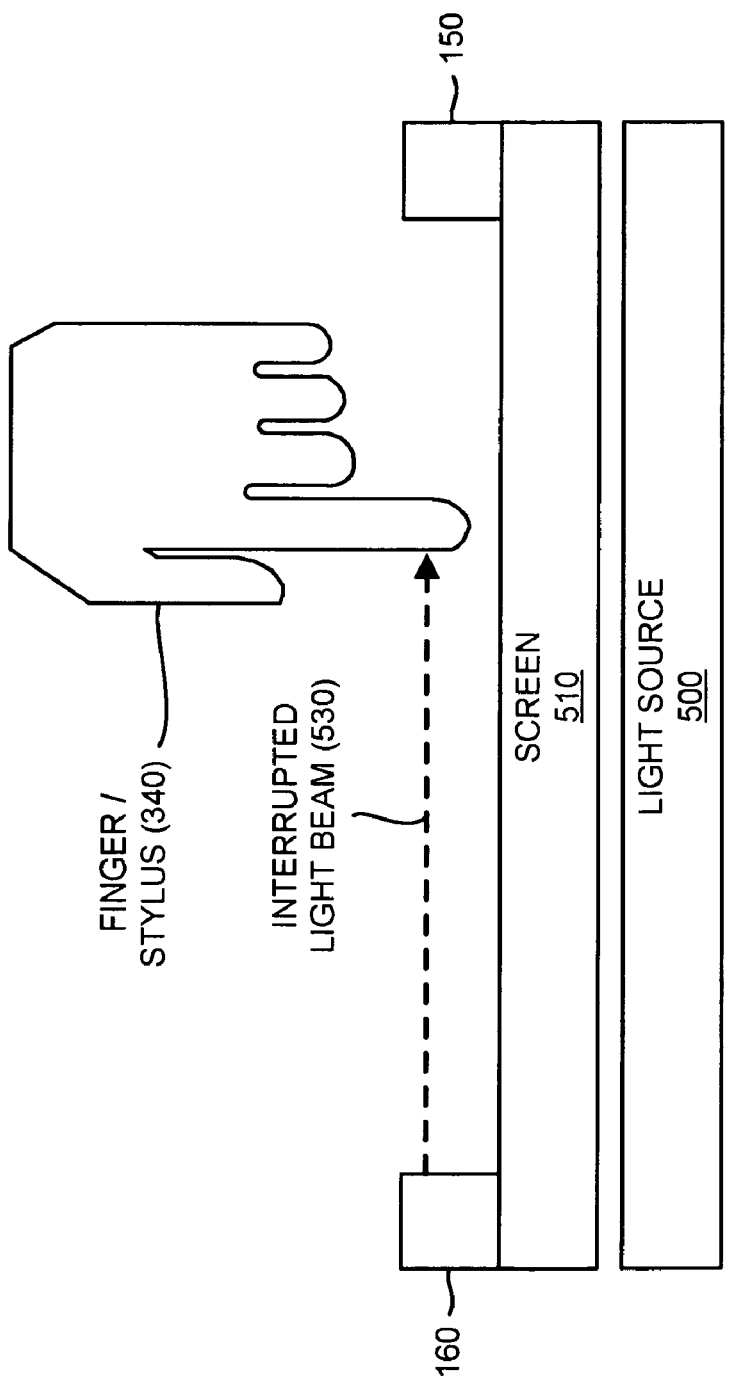

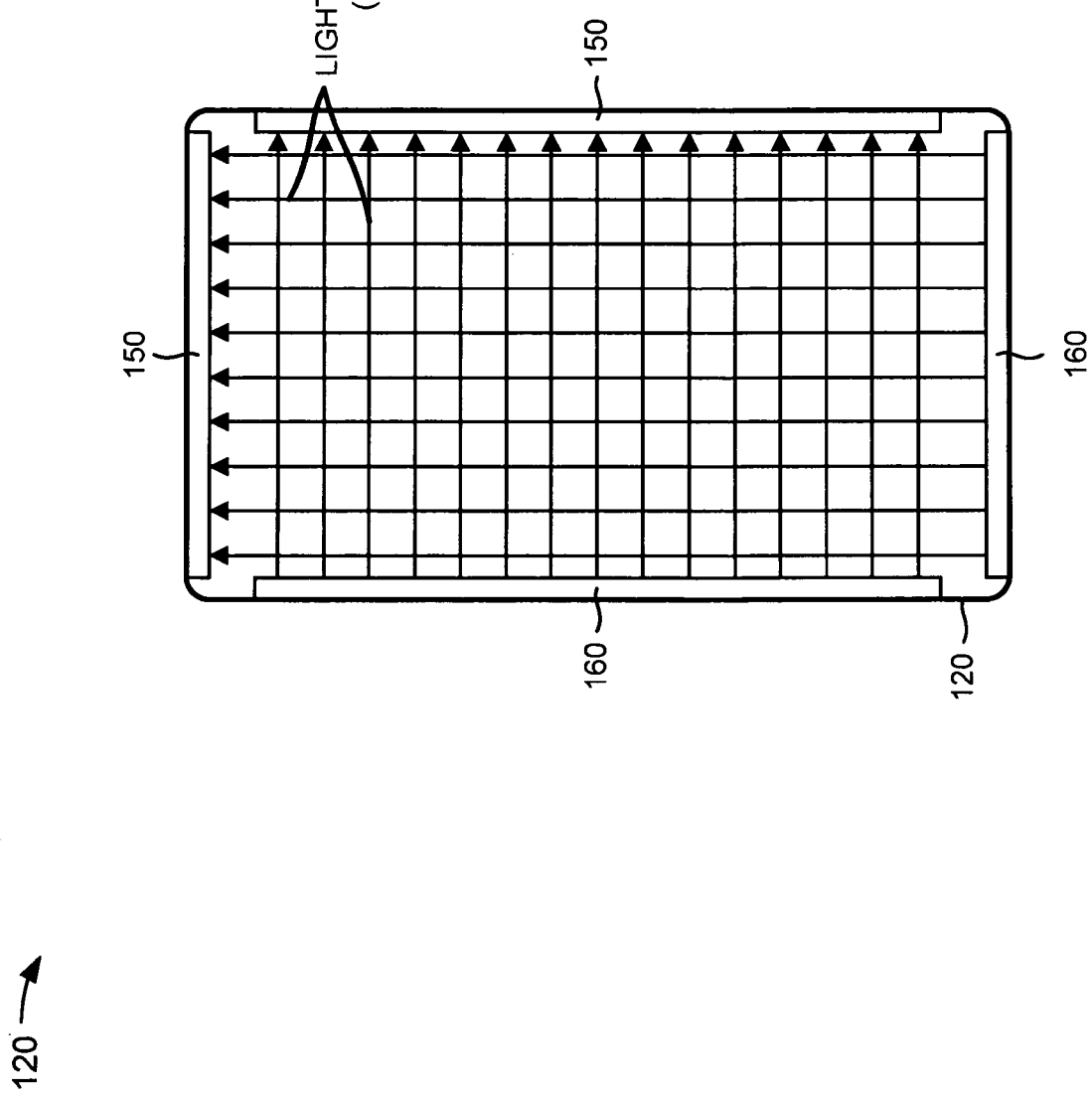

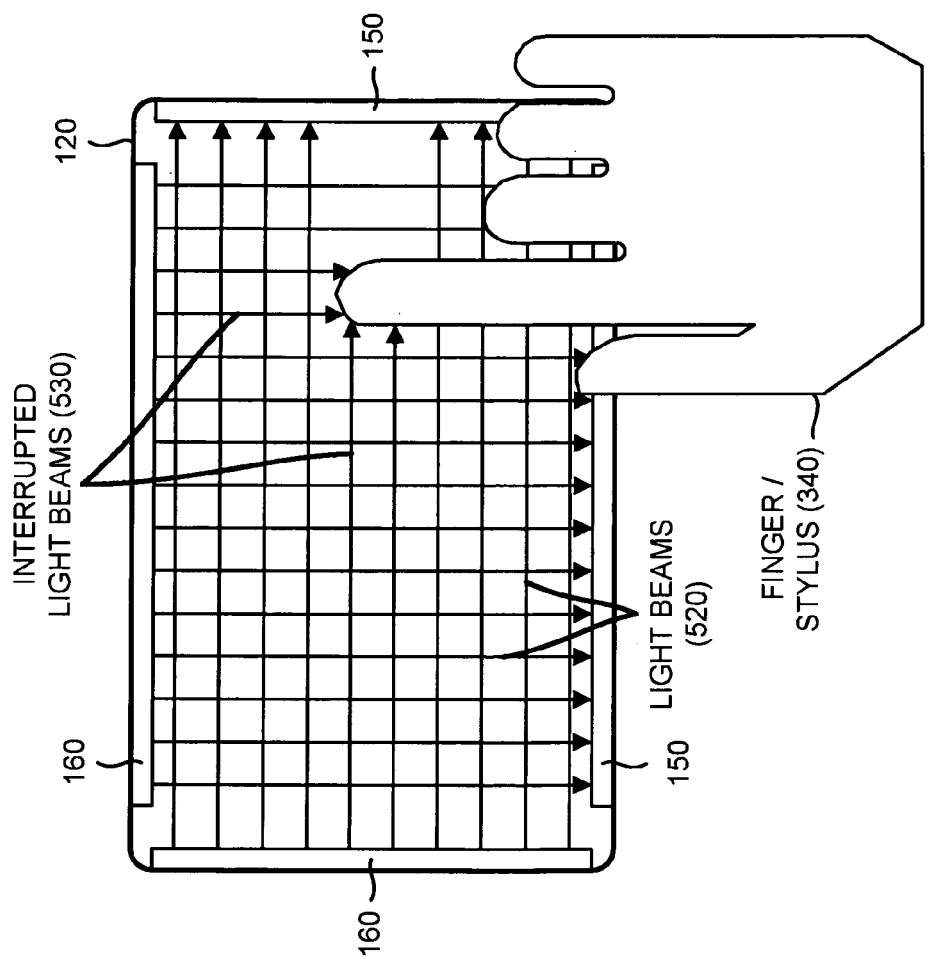

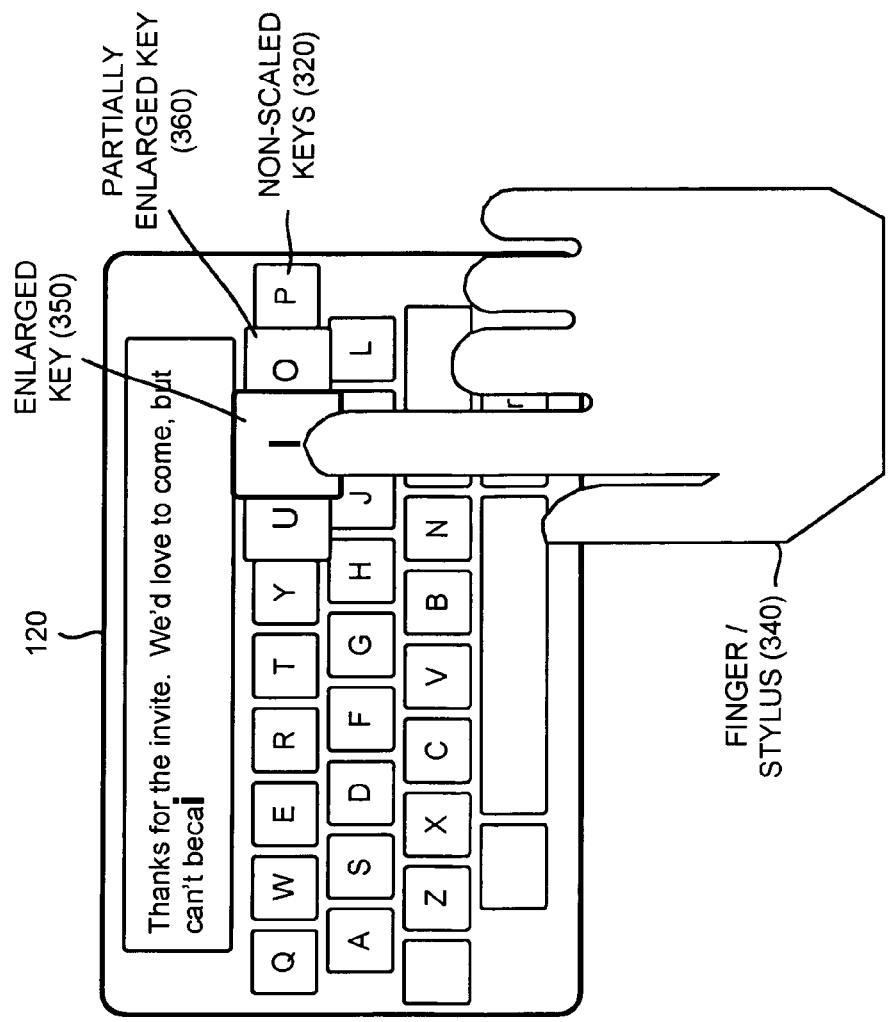

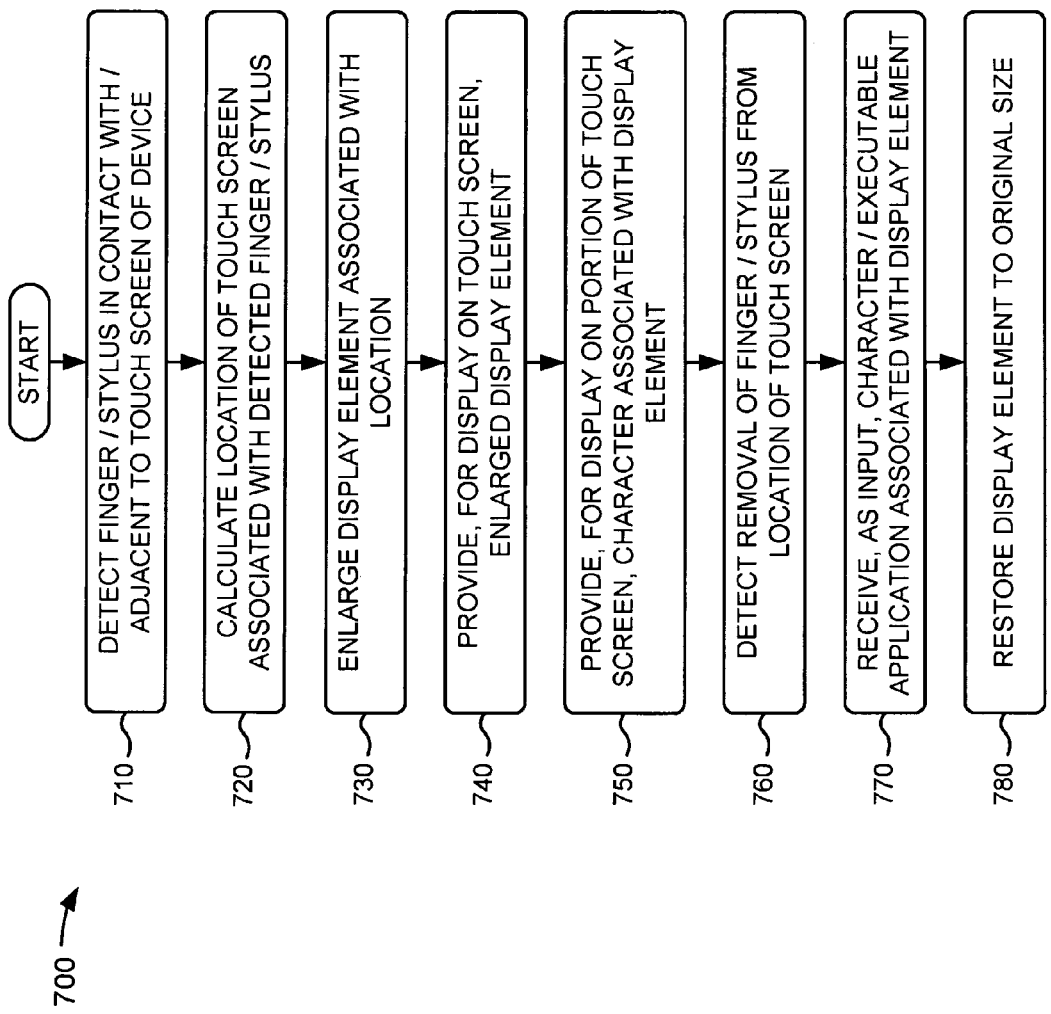

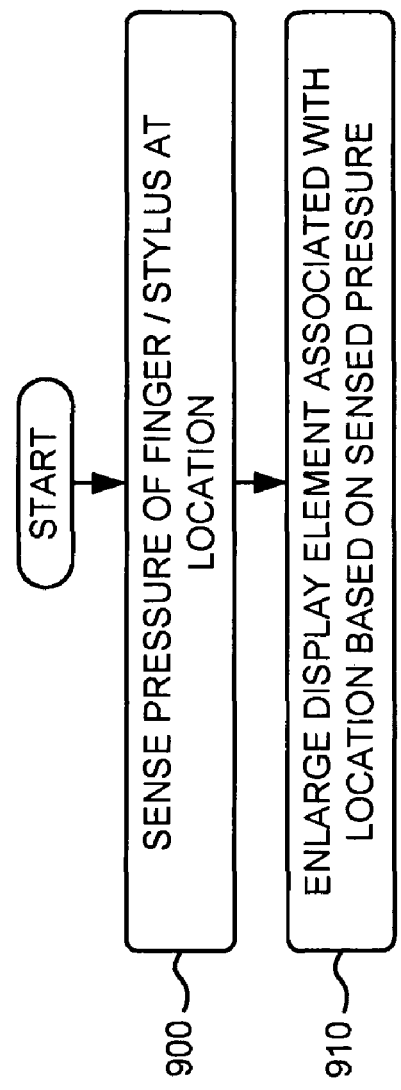

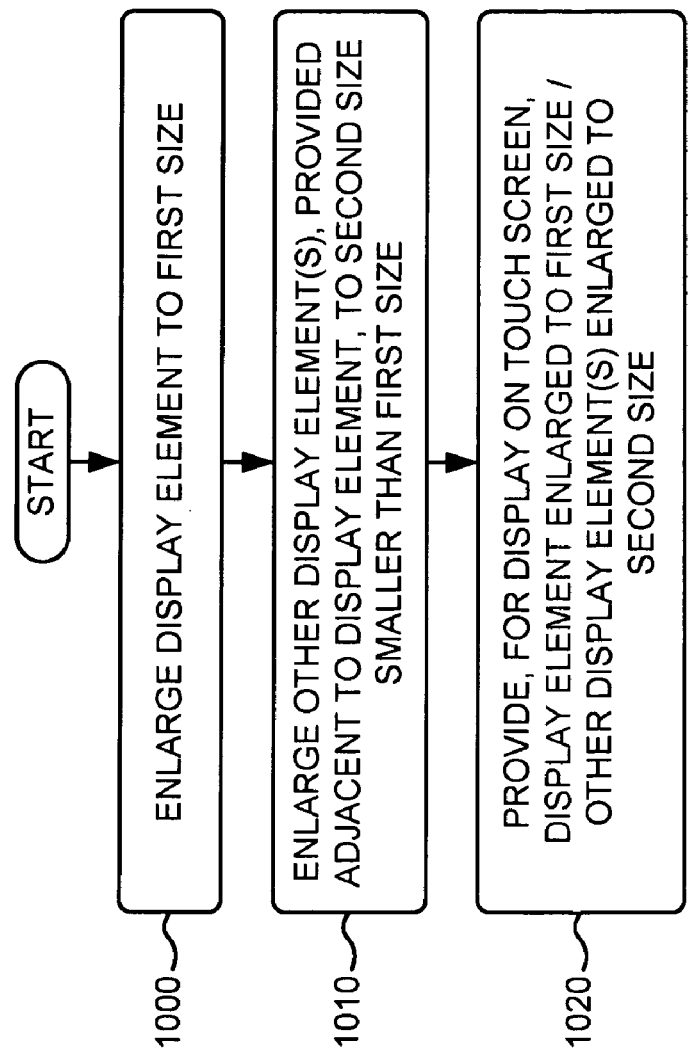

ZOOMING KEYBOARD/KEYPAD

BACKGROUND

Devices, such as mobile communication devices (e.g., cell phones, personal digital assistants (PDAs), etc.), include touch sensitive input devices (e.g., touch sensitive interfaces or displays, touch screens, etc.). Touch screens are usually formed with either a resistive or capacitive film layer, located above a display, which is used to sense a touch of the user's finger or a stylus. Some touch screens enable the user to input information (e.g., text, numbers, etc.) via a keyboard or a keypad displayed on the touch screen. However, the size of a touch screen may be limited due to the size of the device containing the touch screen. Smaller touch screens may display the keyboard or keypad with small keys arranged in close proximity to one another. The closely-arranged, small keys may be difficult to manipulate by the user. For example, the user's finger (e.g., which may be larger than such keys) may accidently select keys adjacent to a desired key, which may cause incorrect input to the device.

BRIEF DESCRIPTION OF THE DRAWINGS

FIGS. 3A-3D depict diagrams of exemplary text entry operations capable of being performed by the device illustrated in FIG. 1;

FIGS. 4A and 4B illustrate diagrams of exemplary application operations capable of being performed by the device depicted in FIG. 1;

FIGS. 5A-5C depict diagrams of exemplary components of a display of the device illustrated in FIG. 1;

FIGS. 6A and 6B depict diagrams of exemplary operations capable of being performed by the display illustrated in FIGS. 5A-5C; and FIGS. 7-10 depict flow charts of an exemplary process for providing a zooming keypad/keyboard on a touch screen according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide a zooming keypad/keyboard on a touch screen of a device (e.g., a cell phone, a PDA, a personal computer, a laptop computer, a remote control, etc.). In one implementation, for example, the systems and/or methods may detect a finger/stylus in contact with and/or adjacent to the touch screen of the device, may calculate a location on the touch screen that is associated with the detected finger/stylus, and may enlarge a display element (e.g., a key, an icon, etc.) associated with the location. The systems and/or methods may display the enlarged display element on the touch screen, and may display, on a portion of the touch screen, a character associated with the display element. The systems and/or methods may detect removal of the finger/stylus from the location on the touch screen, may receive, as an input, a character and/or an executable application associated with the display element, and may restore the display element to its original size.

As used herein, the term "user" is intended to be broadly interpreted to include a device or a user and/or owner of a device. The terms "keypad" and "keyboard" may be used interchangeably herein. The term "touch screen" is intended to be broadly interpreted to include a touch screen display, a touch sensitive input device, a touch sensitive interface, etc. The term "input object," as used herein, is intended to be broadly interpreted to include a user's finger, a stylus, a pen, a pencil, etc. Furthermore, the term "display element," as used herein, is intended to be broadly interpreted to include a key (e.g., of a keypad or keyboard), an icon, a button, a menu, and/or any other mechanism capable of being displayed by a touch screen and selected by a user.

Figure 1:
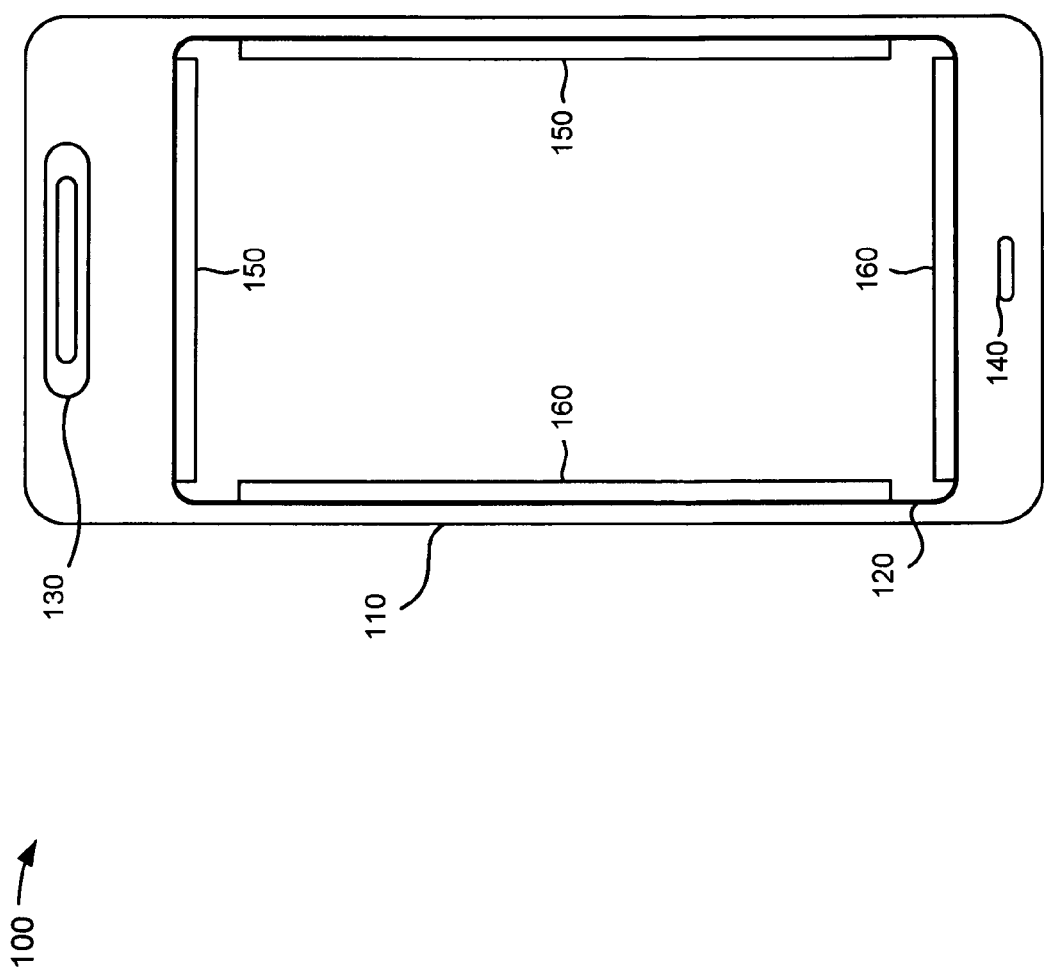
FIG. 1 depicts a diagram of an exemplary device in which systems and/or methods described herein may be implemented.

FIG. 1 is a diagram of an exemplary device 100 in which systems and/or methods described herein may be implemented. Device 100 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a remote control (e.g., for a television), a portable gaming system, a global positioning system (GPS) device, a printer, a facsimile machine, a pager, a camera (e.g., a film camera or a digital camera), a video camera (e.g., a camcorder), a calculator, binoculars, a telescope, a personal computer, a laptop computer, any other device capable of utilizing a touch screen display, a thread or process running on one of these devices, and/or an object executable by one of these devices.

As illustrated in FIG. 1, device 100 may include a housing 110, a display 120, a speaker 130, a microphone 140, light detectors 150, and/or light generators 160.

Housing 110 may protect the components of device 100 from outside elements. Housing 110 may include a structure configured to hold devices and components used in device 100, and may be formed from a variety of materials. For example, housing 110 may be formed from plastic, metal, or a composite, and may be configured to support display 120, speaker 130, microphone 140, light detectors 150, and/or light generators 160.

Display 120 may provide visual information to the user. For example, display 120 may display text input into device 100, text, images, video, and/or graphics received from another device, and/or information regarding incoming or outgoing calls or text messages, emails, media, games, phone books, address books, the current time, etc. In one implementation, display 120 may include a touch screen display that may be configured to receive a user input when the user touches (or comes in close proximity to) display 120. For example, the user may provide an input to display 120 directly, such as via the user's finger, or via other devices, such as a stylus. User inputs received via display 120 may be processed by components and/or devices operating in device 100. The touch screen display may permit the user to interact with device 100 in order to cause device 100 to perform one or more operations. Further details of display 120 are provided below in connection with, for example, FIGS. 2-6B.

Speaker 130 may provide audible information to a user of device 100. Speaker 130 may be located in an upper portion of device 100, and may function as an ear piece when a user is engaged in a communication session using device 100. Speaker 130 may also function as an output device for music and/or audio information associated with games and/or video images played on device 100.

Microphone 140 may receive audible information from the user. Microphone 140 may include a device that converts speech or other acoustic signals into electrical signals for use by device 100. Microphone 140 may be located proximate to a lower side of device 100.

Each of light detectors 150 may include a device capable of detecting variations in light beams generated by light sources 160. For example, each of light detectors 150 may include a camera (e.g., a charge coupled device (CCD) based camera, a complementary metal oxide semiconductor (CMOS) based camera), a photo-detector (e.g., a photo-diode, a photo-transistor, etc.), a photon detector (i.e., a detector where light energy may interact with electrons in the detector's material and may generate free electrons), a thermal detector (i.e., a detector that may respond to heat energy delivered by light), a radar sensor, etc. Photon detectors may further include photoconductive detectors (i.e., incoming light may produce free electrons which can carry electrical current so that the electrical conductivity of the detector material may change as a function of the intensity of the incident light), photovoltaic detectors (a voltage may be generated if optical energy strikes the device), photoemissive detectors (incident photons may release electrons from the surface of the detector material, and the free electrons may be collected in an external circuit), etc.

Each of light generators 160 may include a device configured to emit light in the form of pulses, beams, waves, etc. For example, each of light generators 160 may include one or more separate light emission sources (e.g., one or more light emitting diodes (LEDs), one or more microwave energy transmitters, etc.). Light generators 160 may be positioned and configured to emit light beams across a surface of display 120 in order to create a light grid in a plane adjacent to the surface of display 120. Interruption (or variation) of the light grid (e.g., via a user's finger and/or a stylus) may be detected by light detectors 150, and may be used by device 100 to determine a position of the user's finger and/or the stylus on display 120. Further details of light detectors 150 and light generators 160 are provided below in connection with, for example, FIGS. 5A-6B.

Although FIG. 1 shows exemplary components of device 100, in other implementations, device 100 may contain fewer, different, differently arranged, or additional components than depicted in FIG. 1. For example, device 100 may include may include one or more pressure sensors or a capacitive layer (e.g., arranged below display 120) that may detect a contact location of a finger and/or a stylus on the surface of display 120. In still other implementations, one or more components of device 100 may perform one or more other tasks described as being performed by one or more other components of device 100.

Figure 2:
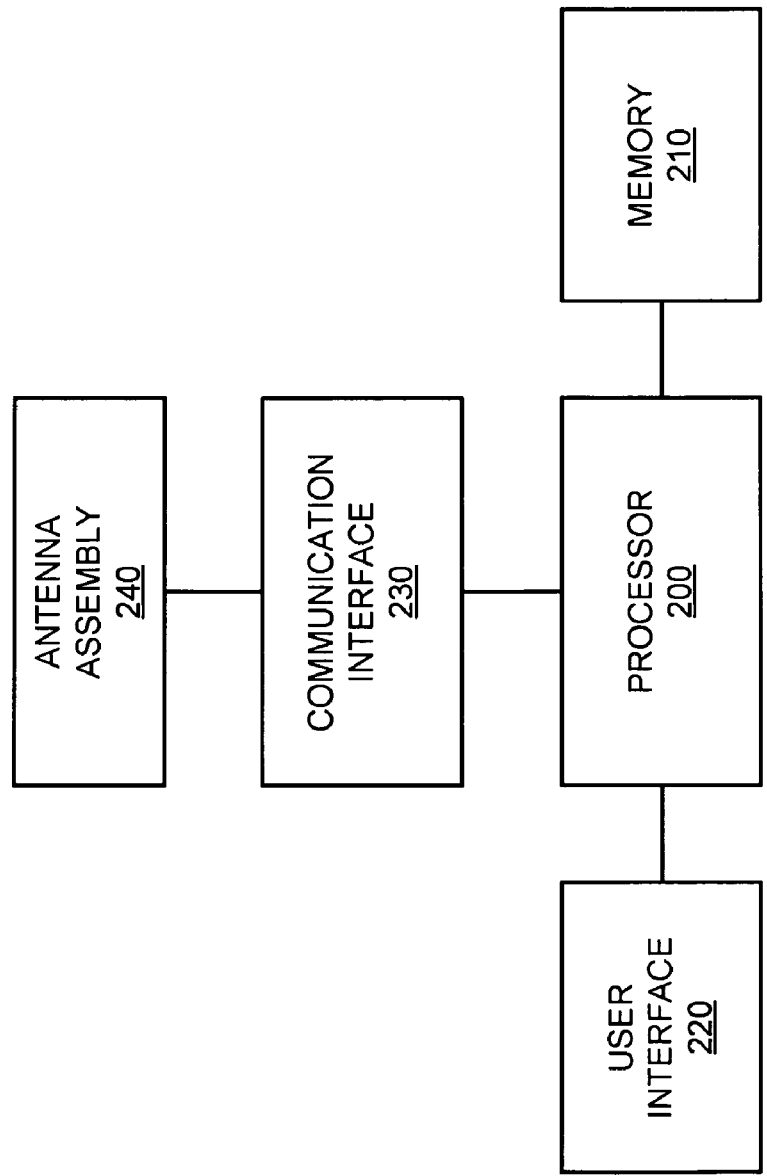
FIG. 2 illustrates a diagram of exemplary components of the device depicted in FIG. 1.

FIG. 2 illustrates a diagram of exemplary components of device 100. As illustrated, device 100 may include a processor 200, memory 210, a user interface 220, a communication interface 230, and/or an antenna assembly 240.

Processor 200 may include one or more microprocessors, application-specific integrated circuits (ASICs), field-programmable gate arrays (FPGAs), or the like. Processor 200 may control operation of device 100 and its components. In one implementation, processor 200 may control operation of components of device 100 in a manner described herein.

Memory 210 may include a random access memory (RAM), a read-only memory (ROM), and/or another type of memory to store data and instructions that may be used by processor 200.

User interface 220 may include mechanisms for inputting information to device 100 and/or for outputting information from device 100. Examples of input and output mechanisms might include buttons (e.g., control buttons, keys of a keypad, a joystick, etc.) or a touch screen interface (e.g., display 120) to permit data and control commands to be input into device 100; a speaker (e.g., speaker 130) to receive electrical signals and output audio signals; a microphone (e.g., microphone 140) to receive audio signals and output electrical signals; a display (e.g., display 120) to output visual information (e.g., text input into device 100); a vibrator to cause device 100 to vibrate; a light generator (e.g., light generators 160) and a light detector (e.g., light detectors 150) to detect a position of a user's finger and/or a stylus on display 120; etc.

Communication interface 230 may include, for example, a transmitter that may convert baseband signals from processor 200 to radio frequency (RF) signals and/or a receiver that may convert RF signals to baseband signals. Alternatively, communication interface 230 may include a transceiver to perform functions of both a transmitter and a receiver. Communication interface 230 may connect to antenna assembly 240 for transmission and/or reception of the RF signals.

Antenna assembly 240 may include one or more antennas to transmit and/or receive RF signals over the air. Antenna assembly 240 may, for example, receive RF signals from communication interface 230 and transmit them over the air, and receive RF signals over the air and provide them to communication interface 230. In one implementation, for example, communication interface 230 may communicate with a network and/or devices connected to a network.

As will be described in detail below, device 100 may perform certain operations described herein in response to processor 200 executing software instructions of an application contained in a computer-readable medium, such as memory 210. A computer-readable medium may be defined as a physical or logical memory device. The software instructions may be read into memory 210 from another computer-readable medium or from another device via communication interface 230. The software instructions contained in memory 210 may cause processor 200 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 100, in other implementations, device 100 may contain fewer, different, differently arranged, or additional components than depicted in FIG. 2. In still other implementations, one or more components of device 100 may perform one or more other tasks described as being performed by one or more other components of device 100.

Figure 3C:
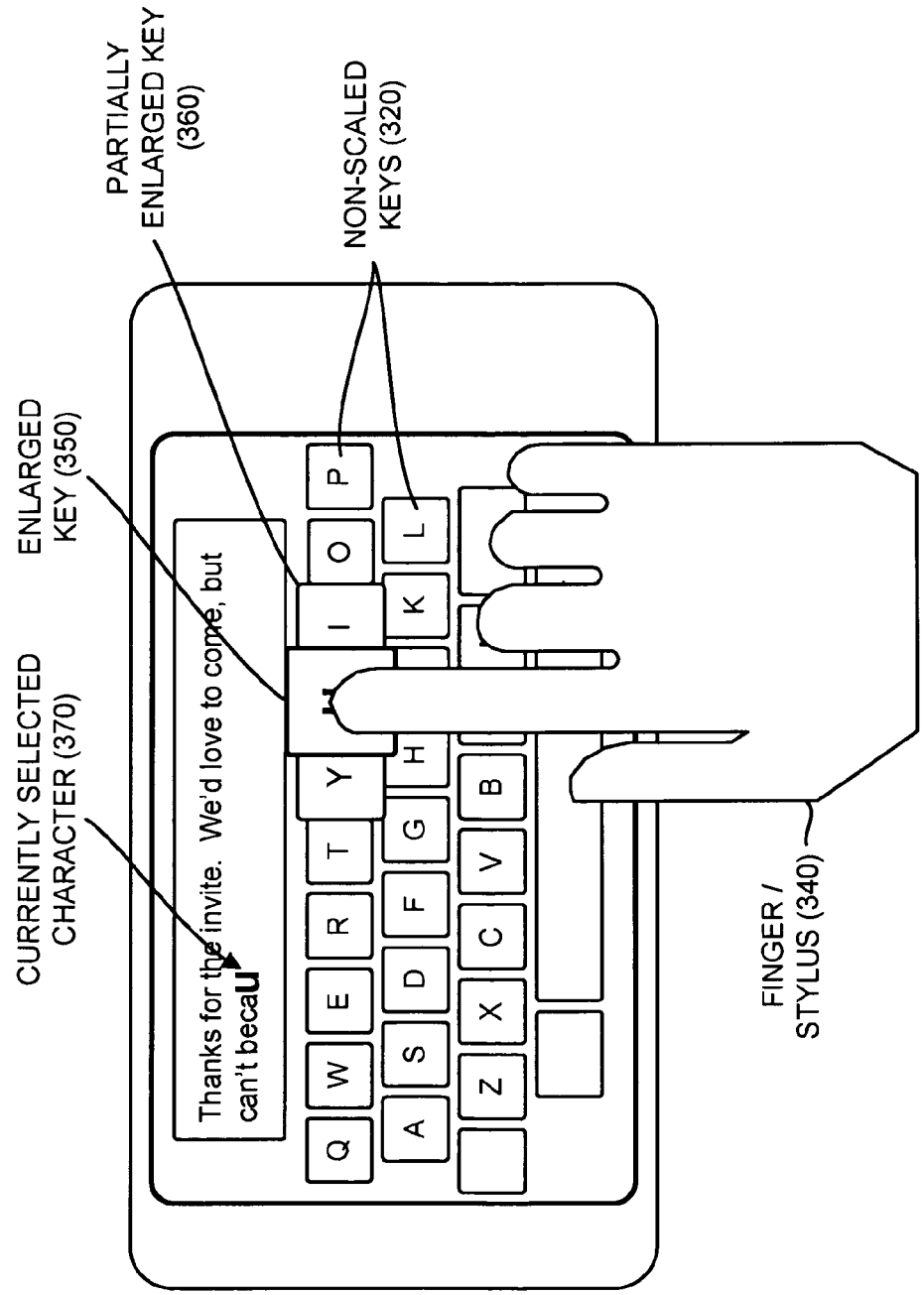

FIGS. 3A-3D depict diagrams of exemplary text entry operations 300 capable of being performed by device 100. In one implementation, the operations described in connection with FIGS. 3A-3D may be performed by processor 200 (FIG. 2). As shown in FIG. 3A, device 100 may include display 120. Display 120 may include the features described above in connection with FIG. 1. As further shown in FIG. 3A, display 120 may display one or more display elements (e.g., icons associated with executable applications, characters (e.g., numbers, letters, punctuation symbols, etc.), etc.). In one exemplary implementation, the display elements may include a touch screen input mechanism 310 (e.g., that includes multiple non-scaled keys 320), and display 120 may further display a touch screen display portion 330.

Touch screen input mechanism 310 may include a QWERTY-like layout (e.g., a traditional configuration of typewriter or computer keyboard keys) of non-scaled keys 320. Each of non-scaled keys 320 may be associated with and may display a corresponding character (e.g., a corresponding QWERTY character). Non-scaled keys 320 may be small and arranged in close proximity to one another, which may make non-scaled keys 320 difficult to manipulate with a user's finger and/or a stylus. In other implementations, touch screen input mechanism 310 may include other display elements (e.g., icons associated with executable applications, a standard telephone keypad, numbers, etc.).

Touch screen display portion 330 may include a portion of display 120 that displays information entered via touch screen input mechanism 310. In one implementation, touch screen display portion 330 may provide secondary feedback (e.g., a visual feedback) associated with the information entered via touch screen input mechanism 310. For example, touch screen display portion 330 may correspond to a window that displays text entered for an email, a short message service (SMS) or text message, a contact of an address book, etc.

As shown in FIG. 3B, if a user attempts to manipulate touch screen input mechanism 310 (e.g., via an input object, such as a finger (e.g., a thumb, an index finger, a middle finger, a ring finger, or a pinkie finger) and/or a stylus 340 associated with the user), device 100 may sense or detect finger/stylus 340 being in contact with and/or being adjacent to touch screen input mechanism 340. Since finger/stylus 340 may be larger than or almost as large as non-scaled keys 320, device 100 may reconfigure touch screen input mechanism 310 accordingly. In one exemplary implementation, device 100 may calculate a location of display 120 (e.g., the touch screen) associated with the detected finger/stylus 340, may enlarge one of non-scaled keys 320 (e.g., an enlarged key 350) associated with the location, and may display enlarged key 350 on display 120. For example, as shown in FIG. 3B, since finger/stylus 340 is provided over the "I" key, device 100 may enlarge the "I" key and may display the enlarged "I" key. If finger/stylus 340 provides pressure on (i.e., contacts) display 120, in one implementation, display 120 may sense a magnitude of the applied pressure (e.g., via a pressure sensor associated with display 120), and may enlarge one of non-scaled keys 320 (e.g., enlarged key 350) associated with the location based on the magnitude of the applied pressure. For example, a larger applied pressure may cause device 100 to provide enlarged key 350 at a first size, and a smaller applied pressure may cause device 100 to provide enlarged key 350 at a second size smaller than the first size.

As further shown in FIG. 3B, device 100 may partially enlarge one or more non-scaled keys 320 (e.g., a partially enlarged key 360) provided adjacent to enlarged key 350, and may display partially enlarged key 360 (e.g., the "U," "O," "J," and "K" keys) on display 120. In one implementation, the enlarged sizes of the partially enlarged key(s) may decrease as a radial distance from enlarged key 350 increases. For example, the enlarged sizes of the partially enlarged key(s) may decrease continuously, in discrete steps, exponentially, etc. as the radial distance from enlarged key 350 increases. Any of the above-mentioned decreasing methods may be set as a default by device 100. A user of device 100 may select the default and/or may change the default as desired.

As also shown in FIG. 3B, device 100 may display (e.g., in touch screen display portion 330) a currently selected character 370 associated with enlarged key 350. For example, since finger/stylus 340 is provided over the "I" key, device 100 may display an "i" in touch screen display portion 330. In one implementation, currently selected character 370 may not be input into device 100 and/or permanently displayed in touch screen display portion 330 unless finger/stylus 340 contacts display 120 (e.g., at enlarged key 350) and removes finger/stylus 340 from contact with display 120.

As shown in FIG. 3C, since the letter "I" may not be the correct letter for the word entered in touch screen display portion 330, finger/stylus 340 may move to another location of display 120. Device 100 may calculate a location of display 120 associated with the detected finger/stylus 340, may generate enlarged key 350 associated with the location, and may display enlarged key 350 on display 120. For example, as shown in FIG. 3C, since finger/stylus 340 is provided over the "U" key, device 100 may enlarge the "U" key and may display the enlarged "U" key. Device 100 may partially enlarge one or more keys (e.g., partially enlarged key 360) provided adjacent to enlarged key 350, and may display partially enlarged key 360 (e.g., the "Y," "I," "H," and "J" keys) on display 120. As further shown in FIG. 3C, device 100 may display (e.g., in touch screen display portion 330) currently selected character 370 associated with enlarged key 350. For example, since finger/stylus 340 is provided over the "U" key, device 100 may display a "u" in touch screen display portion 330.

If the user contacts enlarged key 350 with finger/stylus 340 and removes finger/stylus 340 from contact with display 120, device 100 may detect removal of finger/stylus 340 from enlarged key 350. For example, as shown in FIG. 3D, finger/stylus 340 may be moved away from display 120. Device 100 may receive an input character 380 (e.g., the letter "u") associated with enlarged key 350 (e.g., the "U" key), and may restore enlarged key 350 and partially enlarged key 360 to their original sizes. In other words, device 100 may reconfigure touch screen input mechanism 310 to its original configuration, as shown in FIG. 3A.

Although FIGS. 3A-3D show exemplary text entry operations 300 associated with device 100, in other implementations, device 100 may perform fewer, different, or additional operations than depicted in FIGS. 3A-3D.

FIGS. 4A and 4B illustrate diagrams of exemplary application operations 400 capable of being performed by device 100. In one implementation, the operations described in connection with FIGS. 4A and 4B may be performed by processor 200 (FIG. 2). As shown in FIG. 4A, device 100 may include display 120. Display 120 may include the features described above in connection with FIG. 1. As further shown in FIG. 4A, display 120 may display one or more display elements. In one exemplary implementation, the display elements may include icons (e.g., non-scaled icons 410) associated with executable applications (e.g., an icon for an email application, an icon for a telephone application, an icon for an Internet application, an icon for a music application, etc.) capable of being executed by device 100. Each of non-scaled icons 410 may display information associated with the executable application corresponding to each of non-scaled icons 410. Non-scaled icons 410 may be small and arranged in close proximity to one another, which may make non-scaled icons 410 difficult to manipulate with a user's finger and/or a stylus.

As further shown in FIG. 4A, if a user attempts to manipulate display 120 (e.g., via finger/stylus 340 associated with the user), device 100 may sense or detect finger/stylus 340 being in contact with and/or being adjacent to display 120. Since finger/stylus 340 may be larger than or almost as large as non-scaled icons 410, device 100 may reconfigure non-scaled icons 410 accordingly. In one exemplary implementation, device 100 may calculate a location of display 120 associated with the detected finger/stylus 340, may enlarge one of non-scaled icons 410 (e.g., an enlarged icon 420) associated with the location, and may display enlarged icon 420 on display 120. For example, as shown in FIG. 4A, since finger/stylus 340 is provided over the "Phone" icon, device 100 may enlarge the "Phone" icon and may display the enlarged "Phone" icon.

Device 100 may partially enlarge one or more icons (e.g., a partially enlarged icon 430) provided adjacent to enlarged icon 420, and may display partially enlarged icon 430 (e.g., the "Email" and "Internet" icons) on display 120. In one implementation, the enlarged sizes of the partially enlarged icon(s) may decrease as a radial distance from enlarged icon 420 increases. For example, the enlarged sizes of the partially enlarged icon(s) may decrease continuously, in discrete steps, exponentially, etc. as the radial distance from enlarged icon 420 increases. Any of the above-mentioned decreasing methods may be set as a default by device 100. A user of device 100 may select the default and/or may change the default as desired.

If the user contacts enlarged icon 420 with finger/stylus 340 and removes finger/stylus 340 from contact with display 120, device 100 may detect removal of finger/stylus 340 from enlarged icon 420, and may execute the application associated with enlarged icon 420 (e.g., the "Phone" application). As shown in FIG. 4B, execution of the "Phone" application may cause device 100 to display (e.g., via display 120) a standard telephone keypad that includes non-scaled keys (e.g., a non-scaled key 440) and enables the user to input a telephone number. As further shown in FIG. 4B, if a user attempts to manipulate the standard telephone keypad (e.g., via finger/stylus 340), device 100 may sense or detect finger/stylus 340 being in contact with and/or being adjacent to display 120. Since finger/stylus 340 may be larger than or almost as large as non-scaled key 440, device 100 may reconfigure the standard telephone keypad accordingly. In one exemplary implementation, device 100 may calculate a location of display 120 associated with the detected finger/stylus 340, may enlarge one of the non-scaled keys (e.g., an enlarged key 450) associated with the location, and may display enlarged key 450 on display 120. For example, as shown in FIG. 4B, since finger/stylus 340 is provided over the "4" key, device 100 may enlarge the "4" key and may display the enlarged "4" key.

Device 100 may partially enlarge one or more keys (e.g., a partially enlarged key 460) provided adjacent to enlarged key 450, and may display partially enlarged key 460 (e.g., the "5" key) on display 120. In one implementation, the enlarged sizes of the partially enlarged key(s) may decrease as a radial distance from enlarged key 450 increases. For example, the enlarged sizes of the partially enlarged key(s) may decrease continuously, in discrete steps, exponentially, etc. as the radial distance from enlarged key 450 increases. Any of the above-mentioned decreasing methods may be set as a default by device 100. A user of device 100 may select the default and/or may change the default as desired.

As also shown in FIG. 4B, device 100 may display a currently selected number 470 associated with enlarged key 450. For example, since finger/stylus 340 is provided over the "4" key, device 100 may display a "4" in a portion of display 120. In one implementation, currently selected number 470 may not be input into device 100 and/or permanently displayed on display 120 unless finger/stylus 340 contacts display 120 (e.g., at enlarged key 450) and removes finger/stylus 340 from contact with display 120.

Although FIGS. 4A and 4B show exemplary text entry operations 300 associated with device 100, in other implementations, device 100 may perform fewer, different, or additional operations than depicted in FIGS. 4A and 4B.

FIGS. 5A-5C depict diagrams of exemplary components of display 120. As shown in FIG. 5A, which depicts a partial side view, display 120 may include a light source 500, a screen 510, one of light detectors 150, and one of light generators 160. Light generator 150 and light detector 160 may include the features described above in connection with, for example, FIG. 1.

Light source 500 may include a device (e.g., a backlight) that provides backlighting to a lower surface of screen 510 in order to display information. For example, light source 500 may include one or more incandescent light bulbs, one or more light-emitting diodes (LEDs), an electroluminescent panel (ELP), one or more cold cathode fluorescent lamps (CCFL), one or more hot cathode fluorescent lamps (HCFL), etc. that illuminate portions of screen 510. Incandescent light bulbs may be used when very high brightness is desired. LEDs may be used in small, inexpensive lighting arrangements, and may include colored or white light. An ELP may be used for larger lighting arrangements or when even lighting is desired, and may be either colored or white. CCFLs may be used in large lighting arrangements and may be white in color. In another example, light source 500 may employ one or more diffusers or light guides to provide even lighting from an uneven source. In still another example, light source 500 can include any color light source (e.g., yellow, green, blue, white, etc.) or any combination of colored/non-colored light sources. The light provided by light source 500 may also be used to provide front lighting to an upper surface of screen 510 that faces a user.

Screen 510 may include any device capable of providing visual information (e.g., text, images, video, incoming or outgoing calls, games, phone books, the current time, emails, etc.) to a user. For example, screen 510 may include a liquid crystal display (LCD), such as a thin film transistor (TFT) LCD, etc. In one exemplary implementation, screen 510 may include a plastic substrate that arranges TFT on a metal foil (rather than on glass), which may permit screen 510 to recover its original shape after being bent. Screen 510 may include a color filter coated onto the plastic substrate, which may permit screen 510 to display color images. In other implementations, screen 510 may include a monochrome, flexible LCD.

In one implementation, screen 510 may include any number of color and/or monochrome pixels. In another implementation, screen 510 may include a passive-matrix structure or an active-matrix structure. In a further implementation, if screen 510 is a color array, each pixel may be divided into three cells, or subpixels, which may be colored red, green, and blue by additional filters (e.g., pigment filters, dye filters, metal oxide filters, etc.). Each subpixel may be controlled independently to yield numerous possible colors for each pixel. In other implementations, each pixel of screen 510 may include more or less than three subpixels of various colors other than red, green, and blue.

As further shown in FIG. 5A, light generator 160 may generate a light beam 520 that may be received by light detector 150. Light generator 160 may be positioned and configured to emit light beams (e.g., light beam 520) across a surface of screen 510 in order to create a light grid in a plane adjacent to the surface of screen 510. Such an arrangement may enable device 100 to determine a position of finger/stylus 340 relative to screen 510 if finger/stylus 340 is provided close enough to the surface of screen 510 to interrupt light beam 520.

As shown in FIG. 5B, when finger/stylus 340 close enough to the surface of screen 510, finger/stylus 340 may interrupt light beam 520 (e.g., may cause an interrupted light beam 530) and may prevent light detector 150 from receiving interrupted light beam 530. This may enable device 100 to determine a position of finger/stylus 340 relative to screen 510 in one direction (e.g., in a x-direction or in a y-direction).

As shown in FIG. 5C, which depicts a top view, since light generators 160 generate light beams 520 in both the x-direction and the y-direction (e.g., to create a light grid), finger/stylus 340 may interrupt certain light beams 520 generated in the x-direction and certain light beams 520 generated in the y-direction. Interruption (or variation) of the light grid (e.g., via finger/stylus 340) may be detected by light detectors 150, and may be used by device 100 to determine a position of finger/stylus 340 relative to screen 510 (e.g., relative to display 120). In one exemplary implementation, device 100 may calculate a first coordinate (e.g., an x-coordinate) associated with finger/stylus 340 based on information received from one of light detectors 150, and may calculate a second coordinate (e.g., a y-coordinate) associated with finger/stylus 340 based on information received from the other one of light detectors 150. Device 100 may calculate a location of finger/stylus 340 relative to screen 510 based on the calculated first and second coordinates.

Although FIGS. 5A-5C show exemplary components of display 120, in other implementations, display 120 may contain fewer, different, differently arranged, or additional components than depicted in FIGS. 5A-5C. In still other implementations, one or more components of display 120 may perform one or more other tasks described as being performed by one or more other components of display 120.

For example, in one implementation, display 120 may include one or more pressure sensors, arranged below screen 510, that may detect contact (e.g., by finger/stylus 340) with screen 510. The pressure sensors may be configured to determine the location of finger/stylus 340 relative to screen 510 (e.g., to display 120) in a same or similar manner that light detectors 150 and/or light generators 160 are used to determine the location of finger/stylus 340. In another example, if the pressure sensors are small enough, engagement (e.g. via contact finger/stylus 340) of one or more pressure sensors may be used by device 100 to determine an accurate location of finger/stylus 340 relative to screen 510.

In another implementation, screen 510 may include a capacitive touch screen that reacts to capacitance introduced by finger/stylus 340. The capacitive touch screen may include a first capacitive layer provided in a first direction (e.g., the x-direction) and a second capacitive layer provided in a second direction (e.g., the y-direction), which, together, provide a matrix structure. Such an arrangement may enable device 100 to determine an x-coordinate and a y-coordinate (e.g., a location) associated with finger/stylus 340 relative to display 120.

FIGS. 6A and 6B depict diagrams of exemplary operations 600 capable of being performed by display 120. Display 120 may include the features described above in connection with, for example, FIGS. 5A-5C. As shown in FIG. 6A, light generators 160 may generate light beams 520 in both the x-direction and the y-direction (e.g., to create a light grid). Finger/stylus 340 may interrupt certain light beams 520 (e.g., interrupted light beams 530) generated in the x-direction and certain light beams 520 (e.g., interrupted light beams 530) generated in the y-direction. Interruption (or variation) of the light grid (e.g., via finger/stylus 340) may be detected by light detectors 150, and may be used by device 100 to determine a location of finger/stylus 340 relative to display 120.

As shown in FIG. 6B, the location of finger/stylus 340 determined by light detectors 150 (and/or via pressure sensors/capacitive layer if finger/stylus 340 contacts display 120) may be used by device 100 to manipulate display 120. For example, the determined location of finger/stylus 340 may correspond with an "I" key of a keyboard (e.g., touch screen input mechanism 310). Device 100 may enlarge one of non-scaled keys 320 (e.g., enlarged key 350) associated with the location, and may display enlarged key 350 on display 120. Device 100 may also partially enlarge one or more non-scaled keys 320 (e.g., partially enlarged key 360) provided adjacent to enlarged key 350, and may display partially enlarged key 360 (e.g., the "U," "O," "J," and "K" keys) on display 120.

Although FIGS. 6A and 6B show exemplary operations 600 associated with display 120, in other implementations, display 120 may perform fewer, different, or additional operations than depicted in FIGS. 6A and 6B.

FIGS. 7-10 depict flow charts of an exemplary process 700 for providing a zooming keypad/keyboard on a touch screen according to implementations described herein. In one implementation, process 700 may be performed by device 100. In another implementation, some or all of process 700 may be performed by another device or group of devices, including or excluding device 100.

As illustrated in FIG. 7, process 700 may begin with detection of a finger and/or a stylus in contact with or adjacent to a touch screen of a device (block 710), and calculating a location on the touch screen that is associated with the detected finger/stylus (block 720). For example, in implementations described above in connection with FIG. 3B, device 100 may sense or detect finger/stylus 340 being in contact with and/or being adjacent to touch screen input mechanism 340. Since finger/stylus 340 may be larger than or almost as large as non-scaled keys 320, device 100 may reconfigure touch screen input mechanism 310 accordingly. Device 100 may calculate a location of display 120 (e.g., the touch screen) associated with the detected finger/stylus 340.

As further shown in FIG. 7, a display element associated with the location may be enlarged (block 730), the enlarged display element may be displayed on the touch screen (block 740), and a character associated with the display element may be displayed on a portion of the touch screen (block 750). For example, in implementations described above in connection with FIG. 3B, device 100 may enlarge one of non-scaled keys 320 (e.g., enlarged key 350) associated with the location, and may display enlarged key 350 on display 120. In one example, if finger/stylus 340 is provided over the "I" key, device 100 may enlarge the "I" key and may display the enlarged "I" key. Device 100 may display (e.g., in touch screen display portion 330) currently selected character 370 associated with enlarged key 350. If finger/stylus 340 is provided over the "I" key, device 100 may display an "i" in touch screen display portion 330.

Returning to FIG. 7, removal of the finger/stylus from the location on the touch screen may be detected (block 760), a character or an executable application associated with the display element may be received as an input (block 770), and the display element may be restored to its original size (block 780). For example, in implementations described above in connection with FIG. 3D, if the user contacts enlarged key 350 with finger/stylus 340 and removes finger/stylus 340 from contact with display 120, device 100 may detect removal of finger/stylus 340 from enlarged key 350. In one example, device 100 may receive input character 380 (e.g., the letter "u") associated with enlarged key 350 (e.g., the "U" key), and may restore enlarged key 350 and partially enlarged key 360 to their original sizes. In other words, device 100 may reconfigure touch screen input mechanism 310 to its original configuration.

Figure 8:
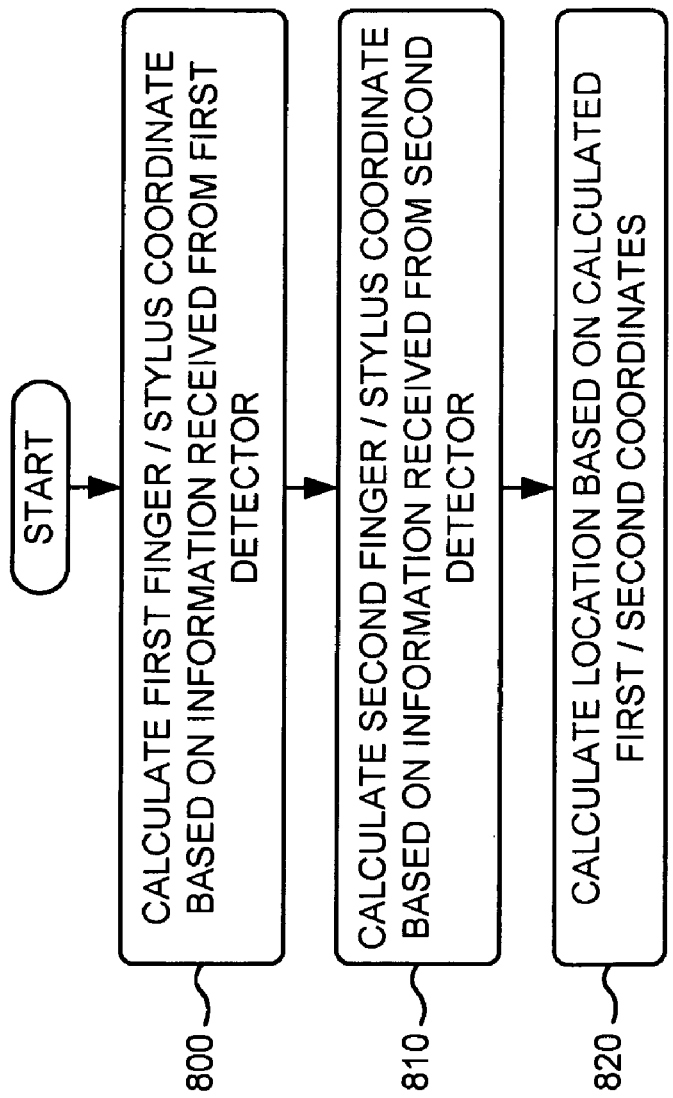

Process block 720 may include the process blocks illustrated in FIG. 8. As shown in FIG. 8, process block 720 may include calculating a first finger/stylus coordinate based on information received from a first detector (block 800), calculating a second finger/stylus coordinate based on information received from a second detector (block 810), and calculating the location on the touch screen that is associated with the finger/stylus based on the first and second finger/stylus coordinates (block 820). For example, in implementations described above in connection with FIG. 5C, device 100 may calculate a first coordinate (e.g., an x-coordinate) associated with finger/stylus 340 based on information received from one of light detectors 150, and may calculate a second coordinate (e.g., a y-coordinate) associated with finger/stylus 340 based on information received from the other one of light detectors 150. Device 100 may calculate a location of finger/stylus 340 relative to screen 510 based on the calculated first and second coordinates.

Process block 730 may include the process blocks illustrated in FIG. 9. As shown in FIG. 9, process block 730 may include sensing a pressure of the finger/stylus at the location on the touch screen that is associated with the finger/stylus (block 900), and enlarging the display element associated with the location based on the sensed pressure (910). For example, in implementations described above in connection with FIG. 3B, if finger/stylus 340 provides pressure on (i.e., contacts) display 120, in one implementation, display 120 may sense a magnitude of the applied pressure (e.g., via a pressure sensor associated with display 120), and may enlarge one of non-scaled keys 320 (e.g., enlarged key 350) associated with the location based on the magnitude of the applied pressure. In one example, a larger applied pressure may cause device 100 to provide enlarged key 350 at a first size, and a smaller applied pressure may cause device 100 to provide enlarged key 350 at a second size smaller than the first size.

Alternatively and/or additionally, process blocks 730 and 740 may include the process blocks illustrated in FIG. 10. As shown in FIG. 10, process blocks 730 and 740 may include enlarging the display element to a first size (block 1000), enlarging one or more other display elements, provided adjacent to the display element, to a second size smaller than the first size (block 1010), and displaying, on the touch screen, the display element enlarged to the first size and the one or more other display elements enlarged to a second size (block 1020). For example, in implementations described above in connection with FIG. 3B, device 100 may partially enlarge one or more non-scaled keys 320 (e.g., partially enlarged key 360) provided adjacent to enlarged key 350, and may display partially enlarged key 360 (e.g., the "U," "O," "J," and "K" keys) on display 120. The enlarged sizes of the partially enlarged key(s) may decrease as a radial distance from enlarged key 350 increases. In one example, the enlarged sizes of the partially enlarged key(s) may decrease continuously, in discrete steps, exponentially, etc. as the radial distance from enlarged key 350 increases.

Systems and/or methods described herein may provide a zooming keypad/keyboard on a touch screen of a device. In one implementation, for example, the systems and/or methods may detect a finger/stylus in contact with and/or adjacent to the touch screen of the device, may calculate a location on the touch screen that is associated with the detected finger/stylus, and may enlarge a display element (e.g., a key, an icon, etc.) associated with the location. The systems and/or methods may display the enlarged display element on the touch screen, and may display, on a portion of the touch screen, a character associated with the display element. The systems and/or methods may detect removal of the finger/stylus from the location on the touch screen, may receive, as an input, a character and/or an executable application associated with the display element, and may restore the display element to its original size.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 7-10, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
    detecting an input object that is one of in contact with or adjacent to a touch screen of the computing device;
    calculating a location on the touch screen that is associated with the detected input object;
    enlarging a display element, associated with the location, to a first size larger than sizes associated with one or more other display elements displayed on the touch screen;
    enlarging one or more other display elements, provided adjacent to the display element, to a second size smaller than the first size;
    displaying, on a first portion of the touch screen, the display element enlarged to the first size and the one or more other display elements, provided adjacent to the display element, enlarged to the second size, the display element overlapping the one or more other display elements; and
    displaying, on a second portion of the touch screen, one or more first characters and a second character, the second character being associated with the display element and a font size of the second character being larger than a font size of the one or more first characters based on the second character being associated with the display element.

2. The computing device-implemented method of claim 1, where the input object comprises at least one of:
   a finger, or
   a stylus.

3. The computing device-implemented method of claim 1, where the display element comprises at least one of:
   a key associated with a keyboard displayed on the touch screen,
   a key associated with a keypad displayed on the touch screen, or
   an icon displayed on the touch screen.

4. The computing device-implemented method of claim 1, further comprising:
   detecting removal of the input object from the location on the touch screen;
   receiving, as an input, a character associated with the display element; and
   restoring the display element to its original size.

5. The computing device-implemented method of claim 1, where calculating a location on the touch screen comprises:
   calculating a first input object coordinate based on information received from a first detector;
   calculating a second input object coordinate based on information received from a second detector; and
   calculating the location on the touch screen that is associated with the detected input object based on the calculated first and second input object coordinates.

6. The computing-device implemented method of claim 5, where:
   each of the first and second detectors comprises a light detector, and
   the first and second detectors are aligned perpendicularly to one another.

7. The computing device-implemented method of claim 1, where enlarging a display element comprises:
   sensing a pressure associated with the input object at the location; and
   enlarging the display element, associated with the location, based on the sensed pressure.

8. The computing device-implemented method of claim 1, where enlarging one or more other display elements comprises:
   determining a proximity, to the display element, of the one or more other display elements provided adjacent to the display element; and
   enlarging the one or more other display elements, provided adjacent to the display element, based on the determined proximity.

9. The computing device-implemented method of claim 1, where the one or more other display elements, provided adjacent to the display element, are enlarged based on a radial distance from the display element.

10. The computing device-implemented method of claim 1, where the computing device comprises one or more of:
    a radiotelephone,
    a personal communications system (PCS) terminal,
    a personal digital assistant (PDA),
    a remote control,
    a portable gaming system,
    a global positioning system (GPS) device,
    a printer,
    a facsimile machine,
    a pager,
    a camera,
    a video camera,
    a calculator,
    binoculars,
    a telescope,
    a personal computer, or
    a laptop computer.

11. The computing device-implemented method of claim 1, where a shape associated with the first size and a shape associated with the second size are the same.

12. A device comprising:
    a touch screen;
    a memory to store a plurality of instructions; and
    a processor to execute instructions in the memory to:
       detect an input object that is one of in contact with or adjacent to the touch screen,
       calculate a location on the touch screen that is associated with the detected input object,
       enlarge a display element, associated with the location, to a first size larger than sizes associated with one or more other display elements displayed on the touch screen,
       enlarge one or more other display elements, provided adjacent to the display element, to a second size smaller than the first size,
       display, on a first portion of the touch screen, the display element enlarged to the first size and the one or more other display elements, provided adjacent to the display element, enlarged to the second size, the display element overlapping the one or more other display elements, and
       display, on a second portion of the touch screen, one or more first characters and a second character, the second character being associated with the display element and a font size of the second character being larger than a font size of the one or more first characters based on the second character being associated with the display element.

13. The device of claim 12, where the device comprises one or more of:
    a radiotelephone,
    a personal communications system (PCS) terminal,
    a personal digital assistant (PDA),
    a remote control,
    a portable gaming system,
    a global positioning system (GPS) device,
    a printer,
    a facsimile machine,
    a pager,
    a camera,
    a video camera,
    a calculator,
    binoculars,
    a telescope,
    a personal computer, or
    a laptop computer.

14. The device of claim 12, where the input object comprises at least one of:
    a finger,
    a stylus,
    a pen, or
    a pencil.

15. The device of claim 12, where the display element comprises at least one of:
    a key associated with a keyboard displayed on the touch screen,
    a key associated with a keypad displayed on the touch screen, or
    an icon, associated with an executable application, displayed on the touch screen.

16. The device of claim 12, where the processor further executes instructions in the memory to:
  detect removal of the input object from the location on the touch screen,
  receive, as an input, a character associated with the display element, and
  restore the display element to its original size.

17. The device of claim 12, further comprising:
  a first detector; and
  a second detector,
  where, when calculating a location on the touch screen, the processor further executes instructions in the memory to:
    calculate a first input object coordinate based on information received from the first detector,
    calculate a second input object coordinate based on information received from the second detector, and
    calculate the location on the touch screen that is associated with the detected input object based on the calculated first and second input object coordinates.

18. The device of claim 17, where:
  each of the first and second detectors comprises a light detector, and
  the first and second detectors are aligned perpendicularly to one another.

19. The device of claim 12, where, when enlarging a display element, the processor further executes instructions in the memory to:
  sense a pressure associated with the input object at the location, and
  enlarge the display element, associated with the location, based on the sensed pressure.

20. The device of claim 12, where, when enlarging one or more other display elements, the processor further executes instructions in the memory to:
  determine a proximity, to the display element, of the one or more other display elements provided adjacent to the display element, and
  enlarge the one or more other display elements, provided adjacent to the display element, based on the determined proximity.

21. The device of claim 12, where the one or more other display elements, provided adjacent to the display element, are enlarged based on a radial distance from the display element.

22. The device of claim 12, further comprising:
  one or more pressure sensors associated with the touch screen, and
  where, when calculating a location on the touch screen, the processor further executes instructions in the memory to:
    detect, with the one or more pressure sensors, a pressure associated with the input object, and
    determine the location on the touch screen that is associated with the detected input object based on the detected pressure.

23. The device of claim 12, where the display element and the one or more other display elements are associated with a QWERTY-like layout keyboard displayed on the touch screen.

24. The device of claim 12, where a shape associated with the first size and a shape associated with the second size are the same.

25. A system comprising:
  means for detecting an input object that is one of in contact with or adjacent to a touch screen of the computing device;
  means for calculating a location on the touch screen that is associated with the detected input object;
  means for enlarging a display element, associated with the location, to a first size larger than sizes associated with one or more other display elements displayed on the touch screen;
  means for enlarging one or more other display elements, provided adjacent to the display element, to a second size smaller than the first size;
  means for displaying, on the touch screen, the display element enlarged to the first size and the one or more other display elements, provided adjacent to the display element, enlarged to the second size, the display element overlapping the one or more other display elements;
  means for displaying, on a portion of the touch screen, one or more first characters and a second character, the second character being associated with the display element and a font size of the second character being larger than a font size of the one or more first characters based on the second character being associated with the display element;
  means for detecting removal of the input object from the location on the touch screen;
  means for receiving, as an input, a character associated with the display element; and
  means for restoring the display element to its original size.

* * * * *